Figure 1:
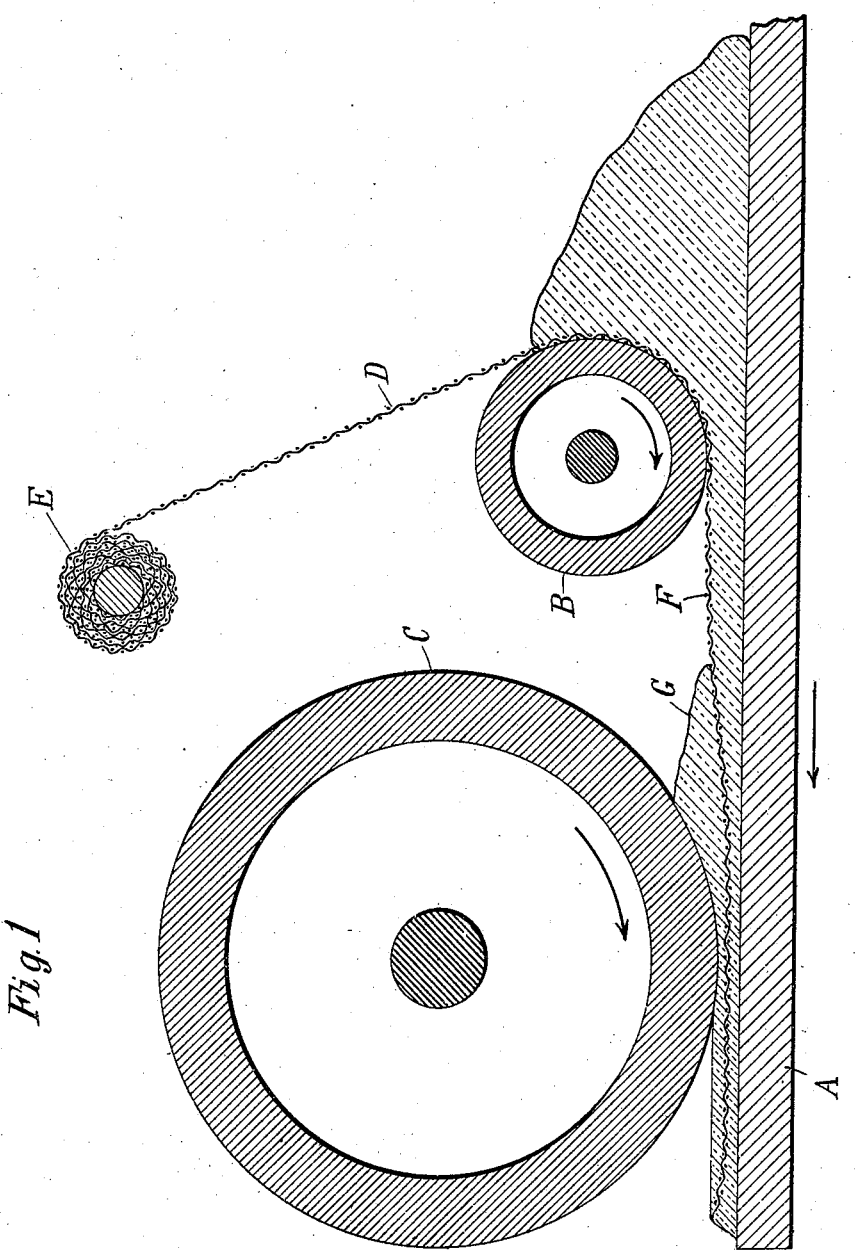

No. 846,771. PATENTED MAR. 12, 1907.
A. J. BALDWIN.
APPARATUS FOR MAKING WIRE GLASS.
APPLICATION FILED NOV. 29, 1905.

Witnesses
Raphaël Netter
S. A. Dunham

A. J. Baldwin, Inventor
By his Attorneys
Kerr, Page & Cooper

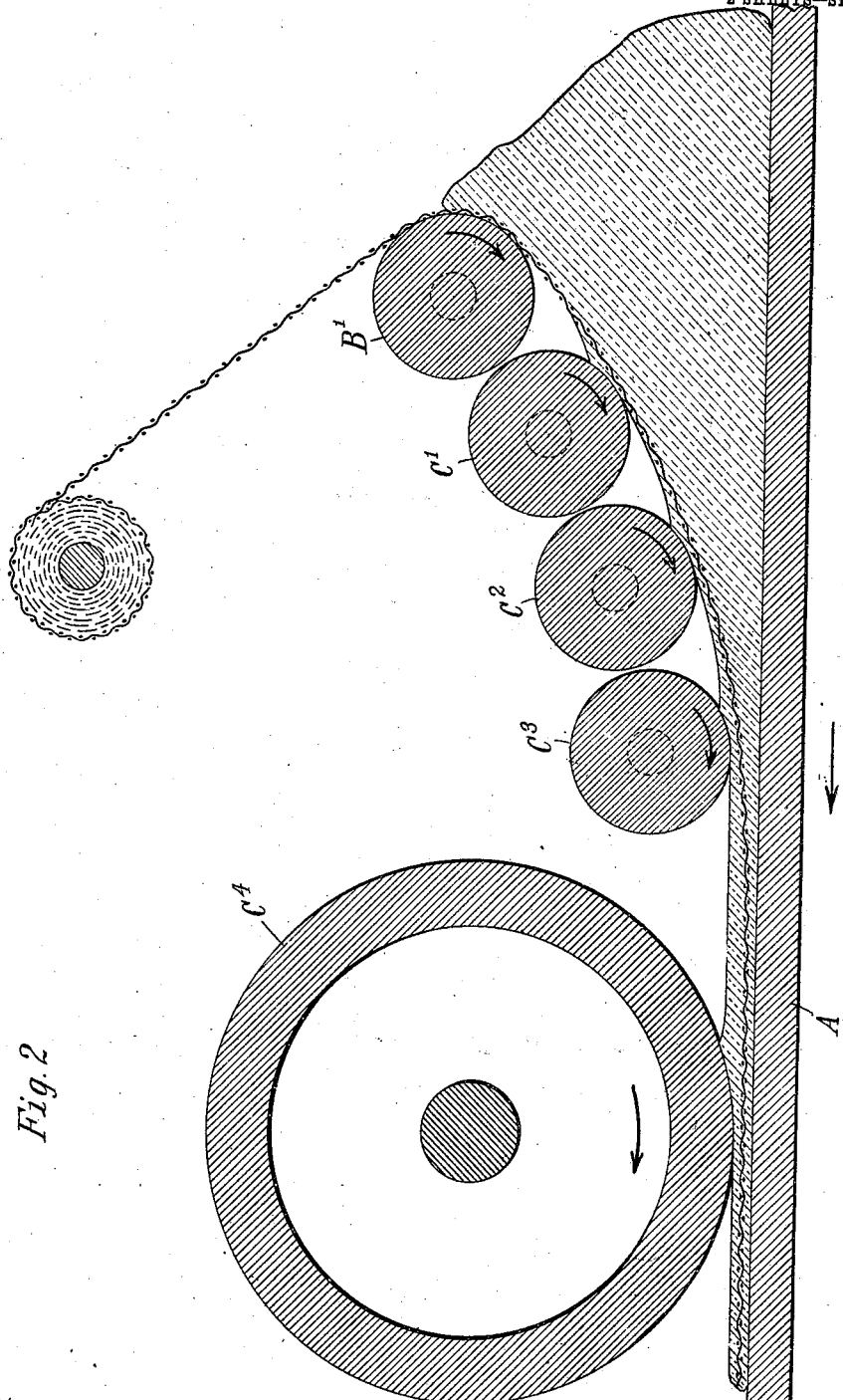

UNITED STATES PATENT OFFICE.

ARTHUR J. BALDWIN, OF EAST ORANGE, NEW JERSEY.

APPARATUS FOR MAKING WIRE-GLASS.

No. 846,771. Specification of Letters Patent. Patented March 12, 1907.

Application filed November 29, 1905. Serial No. 289,589.

*To all whom it may concern:*

Be it known that I, ARTHUR J. BALDWIN, a citizen of the United States, residing at East Orange, county of Essex, and State of New Jersey, have invented certain new and useful Improvements in Apparatus for Making Wire-Glass, of which the following is a specification, reference being had to the drawing accompanying and forming part of the same.

My invention relates to the manufacture of sheet-glass having an embedded strengthening structure known generally as "wire-glass," and has for its object to provide an apparatus for producing such glass in an expeditious and economical manner.

To these ends the invention consists of the novel features, arrangements of parts, and combinations of elements hereinafter described, and more particularly pointed out in the claims.

The invention will be more readily understood in connection with the annexed drawing, in which is shown a convenient embodiment in somewhat diagrammatic form, wherein—

Figure 1 shows the preferred apparatus in longitudinal section. Fig. 2 is a modification, also in longitudinal section.

The sheet of glass is formed on a rolling-surface—that is, a surface upon which the sheet is rolled out—as, for example, a horizontally-moving table of suitable character. Such a table is shown at A, Fig. 1. Coöperating therewith and spaced therefrom a distance somewhat greater than the thickness of the finished sheet is a roll B, the roll being driven, preferably, at the same peripheral speed as the lineal speed of the table.

In front of the roll B is a finishing-roll C, driven at the same peripheral speed as the former, but spaced from the table a distance equal to the thickness of the finished sheet.

The operation of the machine will now be readily understood. On the table back of the roll B is deposited a mass of molten or plastic glass of the proper consistency, and over the rear of the roller is passed a sheet of wire fabric D, drawn from any suitable supply, as the reel E. As the mass of plastic glass is carried under the roll B by the forward movement of the table it is formed by these elements into a thick sheet, as indicated at F, with the fabric at or slightly below the upper surface thereof. This sheet, carried forward by the table, strikes the finishing-roll C, and the sheet being too thick to pass under the roll the surplus glass is squeezed through the meshes of the fabric behind the roll, where it banks up, as indicated at G. This banked-up mass is spread over the wire fabric by the roll C to form the upper layer of the finished sheet. This squeezing or forcing of the surplus glass through the meshes of the fabric and the spreading or rolling of it over the fabric goes on continuously until the sheet is complete.

A modification of the machine is shown in Fig. 2. In this case there are several rolls (indicated by C' C² C³ C⁴) to effect the formation of the upper layer. The roll B' applies the wire fabric to the mass of glass, the first finishing-roll C' squeezes a small amount of glass through the fabric and spreads it over the same, the second rolls C² C³ operate in a similar way, thus making the upper layer thicker, while the last roll C⁴ adds still more glass to the upper layer and turns out the finished sheet.

It is of course evident that any number of forcing or finishing rolls may be employed as desired, though only three are shown.

To those skilled in the art it will be apparent that the physical embodiment of the invention may be modified in various ways without departure from the spirit of the invention as defined by the following claims.

I claim—

1. In an apparatus for making wire-glass, the combination with a rolling-surface, a finishing-roll, and a supply-reel, of a plurality of rolls interposed between the reel and finishing-roll and coacting with material under treatment, said interposed rolls being arranged at varying distances from the rolling-surface.

2. In an apparatus for making wire-glass and in combination a rolling-surface having a rectilinear movement, a finishing-roll mounted thereabove and having a rolling movement in the same general direction as the rolling-surface, a wire-supply and a guide-roll therefor, said guide-roll also having movement in the same general direction as the rolling-surface and having its surface separated from the rolling-surface by a greater distance than that between the periphery of the finishing-roll and the rolling-surface.

3. In an apparatus for making wire-glass, the combination with a rolling-surface, a finishing-roll, and a wire-supply, of a plurality of rolls arranged in close juxtaposition to one another and at gradually-increasing distances from the rolling-surface, said rolls coacting with the material under treatment.

ARTHUR J. BALDWIN.

Witnesses:
 M. LAWSON DYER,
 S. S. DUNHAM.